US005113648A

United States Patent [19]

Shekleton et al.

[11] Patent Number: 5,113,648

[45] Date of Patent: May 19, 1992

[54] COMBUSTOR CARBON SCREEN

[75] Inventors: Jack R. Shekleton; Ray C. Ramirez, both of San Diego, Calif.

[73] Assignee: Sundstrand Corporation, Rockford, Ill.

[21] Appl. No.: 486,132

[22] Filed: Feb. 28, 1990

[51] Int. Cl.$^5$ .................. F02C 7/05

[52] U.S. Cl. .................. 60/39.091; 60/752

[58] Field of Search .......... 60/39.091, 39.092, 39.11, 60/39.36, 39.464, 752; 431/121, 252, 326; 239/575, 590, 590.5

[56] References Cited

U.S. PATENT DOCUMENTS

| | | | |
|---|---|---|---|
| 1,747,273 | 2/1930 | Webb . | |
| 2,030,616 | 2/1936 | Webb . | |
| 2,504,106 | 4/1950 | Berger | 60/752 |
| 3,726,087 | 4/1973 | Bryce | 60/756 |
| 3,780,872 | 12/1973 | Pall . | |
| 4,168,348 | 9/1979 | Bhangu et al. . | |
| 4,169,059 | 9/1979 | Storms . | |
| 4,195,475 | 4/1980 | Verdouw . | |
| 4,262,487 | 4/1981 | Glenn | 60/757 |
| 4,269,032 | 5/1981 | Meginnis et al. . | |
| 4,292,376 | 9/1981 | Hustler . | |
| 4,296,606 | 10/1981 | Reider . | |
| 4,315,406 | 2/1982 | Bhangu et al. . | |
| 4,339,925 | 7/1982 | Eggmann et al. | 60/760 |

FOREIGN PATENT DOCUMENTS

| | | | |
|---|---|---|---|
| 57-67713 | 4/1982 | Japan | 431/121 |

*Primary Examiner*—Richard A. Bertsch

*Assistant Examiner*—Timothy S. Thorpe

*Attorney, Agent, or Firm*—Wood, Phillips, Mason, Recktenwald & VanSanten

[57] ABSTRACT

In order to avoid plugging the air passageways (42*a*) of fuel injectors (42) with carbon particles or lumps in a gas turbine engine (10), the gas turbine engine (10) includes an annular combustor (18) having radial dilution air injection. The gas turbine engine (10) also includes a rotor (12) having turbine blades (14) and a nozzle (16) adjacent the turbine blades (14) which is adapted to direct hot gases of combustion at the turbine blades (14) to cause rotation of the rotor (12). The annular combustor (18) is disposed about the rotor (12) and has an outlet (20) to the nozzle (16), spaced inner and outer walls (22 and 24), and a generally radially extending wall (26) connecting the inner and outer walls (22 and 24). The gas turbine engine (10) further includes a housing (28) substantially surrounding the annular combustor (18) in spaced relation to the inner, outer, and radially extending walls (22, 24 and 26) to define a dilution air flow path (30). The annular combustor (18) has a combustion annulus (36) defined by the inner, outer, and radially extending walls (22, 24 and 26), and a plurality of radially disposed air blast fuel injectors (42). The gas turbine engine (10) also includes dilution air holes (48) for bleeding air into the combustion annulus (36) to mix with the hot gases of combustion. With this arrangement, the gas turbine engine includes a screen or wire mesh for preventing matter potentially obstructive to an air passageway of a fuel injector from passing from a dilution air hole into the air passageway.

15 Claims, 2 Drawing Sheets

COMBUSTOR CARBON SCREEN

RELATED APPLICATION

This application is related as to subject matter with commonly owned and copending patent application of Jack R. Shekleton, Ser. No. 455,596, filed Dec. 21, 1989, titled Injector Carbon Screen.

FIELD OF THE INVENTION

The present invention generally relates to gas turbine engines of the type having air blast fuel injectors and, more particularly, to a gas turbine engine wherein carbon plugging of the fuel injectors is substantially entirely eliminated.

BACKGROUND OF THE INVENTION

Gas turbine engines typically include a combustor in which carbonaceous fuel is combusted with an oxidant such as air to produce hot gases of combustion. Frequently, the hot gases of combustion are diluted with cooler air which together are directed through a turbine nozzle and then against a turbine wheel or rotor. This is done because it is known that high operating temperatures in those parts of turbine engines subjected to the hot gases of combustion are potentially damaging, and large temperature gradients that might otherwise result cause large internal stresses due to differences in thermal expansion. Additionally, the high operating temperatures might otherwise require the use of more expensive materials in constructing gas turbine engine components in order to withstand fatigue. Because of such factors, it has been customary to inject dilution air into the hot gases of combustion at a point upstream of the turbine wheel or rotor and the turbine nozzle.

Typically, it is desired to achieve a substantially uniform circumferential mixing of the dilution air with the hot gases of combustion in order to produce a desirable temperature profile. In an optimal case, there will be a complete mixing of the dilution air with the hot gases of combustion such that a uniform temperature of a stream of combined gases of combustion and dilution air is achieved which means that the operating temperature can be adequately regulated by controlling, through suitable design parameters, the amount of dilution air in proportion to the gases of combustion. At the same time, severe temperature gradients will be nonexistent because all parts of the gas stream being applied to the turbine nozzle and thus to the turbine wheel or rotor are at substantially equal temperatures.

Perfect circumferential mixing cannot be obtained in practice although it may be more closely approached in large sized turbines. This follows because the size of the components is such that there is substantial residence time of the combustion gases and dilution air in a large combustor prior to their arrival at the turbine nozzle so as to allow fairly thorough mixing. However, for small sized turbines, the residence time is ordinarily extremely short such that adequate mixing will not necessarily occur.

In order to attain desired temperature gradients within a small combustor, cooling air can be injected into the combustion chamber through a plurality of dilution air holes. As will be appreciated, the dilution air holes will make it possible to be able to maintain an acceptably uniform temperature gradient within the combustion chamber.

However, there is another problem intertwined with the use of dilution air holes. During the combustion process, there is a tendency for carbon build-up to occur in the combustor as a result of a number of factors. For instance, fuel maldistributions may result from contamination such as gum build-up in the fuel injectors after considerable periods of service and, when this happens, carbon build-up may result and operating efficiency will necessarily be adversely affected. But even more importantly carbon build-up is undesirable since pieces of carbon may break off and be swept throughout the engine. Such carbon can cause erosion of engine parts and reduce the life of the engine.

As for air blast fuel injectors, the air passageways are susceptible to plugging by one or more carbon lumps formed when carbon breaks away from a carbon build-up within the combustion chamber. When carbon breaks away, a carbon lump may subsequently fall out of the combustion chamber through a dilution air hole into the combustor air flow annulus between the combustor housing and the wall defining the combustion chamber, typically, as the gas turbine engine is being shut down. In a subsequent restart, the carbon lump can be carried forward by compressed air flowing through the combustor air flow annulus until it eventually lodges in the air passageway of one of the fuel injectors.

Obviously, if the air passageway of the air blast fuel injector is blocked, poor fuel atomization will occur which can be very destructive inasmuch as hot streaks can be formed which can seriously damage the turbine nozzle. When this occurs, there will be an even more accelerated carbon build-up which can result in still additional carbon lumps with consequent rapid erosion of the turbine nozzle and turbine wheel or rotor.

The present invention is directed to overcoming one or more of the foregoing problems and achieving one or more of the resulting objects.

SUMMARY OF THE INVENTION

It is a principal object of the present invention to provide a gas turbine engine which successfully prevents carbon, and especially carbon lumps, from plugging an air blast fuel injector downstream of a dilution air hole through which the lumps may pass. More specifically, it is an object of the invention to provide a combustor with a screen sized to catch the lumps wherein the screen is placed to avoid interference with flow through a dilution air flow path. It is a still further object of the present invention to provide a combustor designed such that the screen is entirely exposed to dilution air while covering the dilution air holes substantially contiguous with the combustor wall upstream of the air blast fuel injectors.

In an exemplary embodiment, a gas turbine engine includes a rotor having turbine blades and a nozzle adapted to direct hot gases to the turbine blades to cause rotation of the rotor. The engine also includes an annular combustor about the rotor having an outlet to the nozzle. The combustor has spaced inner and outer walls connected by a generally radially extending wall to define a combustion annulus upstream of the outlet. A housing substantially surrounds the annular combustor in spaced relation to the walls of the combustor to define a dilution air flow path extending at least part way about the combustor and including a compressed air inlet in communication with a source of compressed air. The engine also includes at least one fuel injector and at least one dilution air hole upstream of the fuel injector.

The fuel injector extends through one of the walls of the combustor in fluid communication with the dilution air flow path and is positioned to inject air and fuel into the combustion annulus. With this arrangement, the engine also includes means associated with the dilution air hole for preventing potentially obstructive matter from the combustion annulus from passing from the dilution air hole into the dilution air flow path.

In a preferred embodiment of the invention, the dilution air hole is in the outer wall of the combustor to accommodate communication of the dilution air flow path with the combustion annulus. The matter preventing means then preferably comprises a screen positioned to entirely cover the dilution air hole in a manner accommodating substantially unimpeded air flow through the dilution air flow path. Advantageously, the screen is secured to the outer surface of the outer wall of the combustor by brazing such that the wire mesh of the screen is substantially entirely exposed to the dilution air flow path.

In a highly preferred embodiment, the gas turbine engine includes a plurality of fuel injectors and a plurality of dilution air holes. The dilution air holes are circumferentially spaced to accommodate communication of the dilution air flow path with the combustion annulus. With this arrangement, the screen is well suited for preventing matter from passing into one or more of the air passageways of the plurality of fuel injectors.

Other objects, advantages and features of the present invention will become apparent from the following specification taken in conjunction with the accompanying drawings.

DETAILED DESCRIPTION OF THE PREFERRED EMBODIMENT

Figure 1:
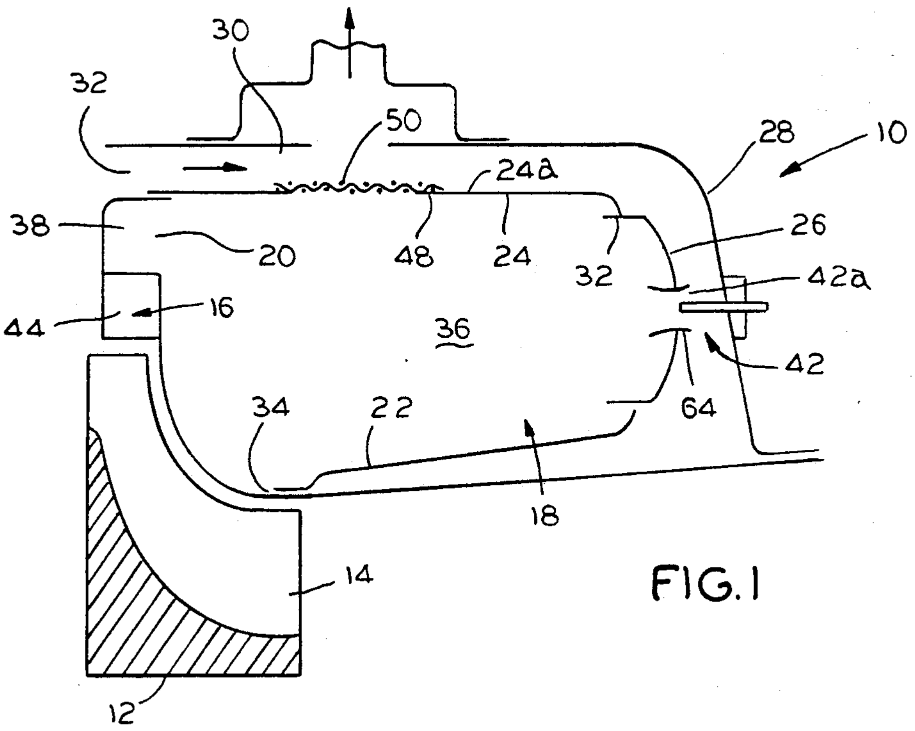
FIG. 1 is a somewhat schematic fragmentary sectional view of a gas turbine engine constructed in accordance with the present invention.
Figure 2A:
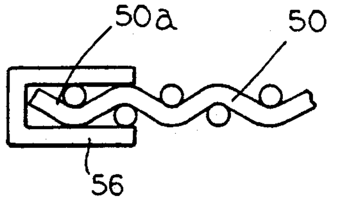
FIG. 2*a* is a somewhat schematic fragmentary sectional view of a screen having typical selvage to prevent unraveling thereof.
Figure 2B:
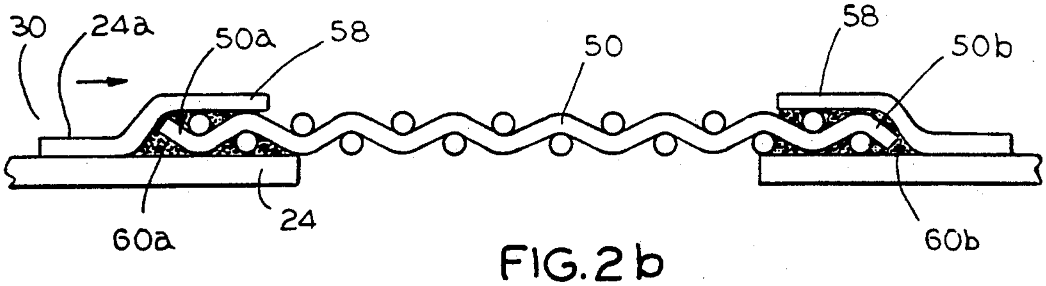
FIG. 2*b* is a somewhat schematic fragmentary sectional view of a screen insulating strip to prevent unraveling of the screen.
Figure 2C:
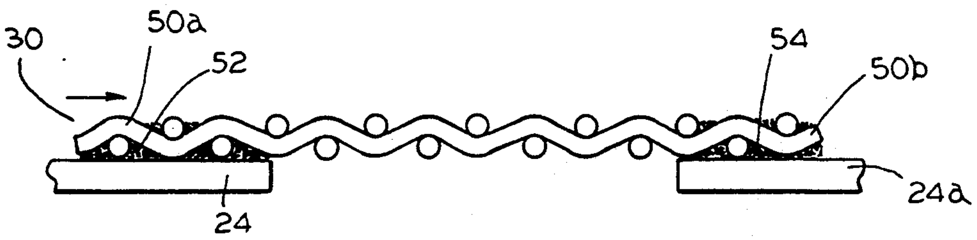
FIG. 2*c* is a somewhat schematic fragmentary sectional view of a matter preventing wire mesh screen for the gas turbine engine of FIG. 1.

An exemplary embodiment of a gas turbine engine constructed in accordance with the invention is illustrated in FIG. 1. However, the invention is not so limited, having applicability to any form of turbine or other fuel combusting device. In fact, the invention is suited for preventing potentially obstructive matter from passing into any air blast fuel injector.

Referring to FIG. 1, the reference numeral 10 designates generally a gas turbine engine shown herein for illustration purposes as being of the radial flow type. The gas turbine engine 10 has a turbine wheel or rotor 12 including turbine blades 14 and a turbine nozzle 16 adjacent the turbine blades 14. The turbine nozzle 16 is adapted to direct hot gases of combustion at the turbine blades 14 to cause rotation of the rotor 12. In addition, the gas turbine engine 10 includes an annular combustor generally designated 18 about the rotor 12 and having an outlet 20 to the nozzle 16.

As shown in FIG. 1, the annular combustor 18 has spaced inner and outer walls 22 and 24, respectively, and a generally radially extending wall 26 connecting the inner and outer walls 22 and 24. A housing 28 substantially surrounds the annular combustor 18 in spaced relation to the inner, outer and radially extending walls 22, 24 and 26, respectively, to define a dilution air flow path generally designated 30. The dilution air flow path 30 comprises a compressed air annulus between the housing 28 and the walls 22, 24 and 26. A compressed air inlet as at 32 in communication with a compressor (not shown) supplies air at one end of the dilution air flow path 30 and a compressed air outlet 34 is in communication with the annular combustor 18 at the other end thereof. As will be seen, the dilution air flow path 30 extends at least part way and preferably substantially entirely about the annular combustor 18 to cool the inner, outer, and radially extending walls 22, 24 and 26 respectively.

As shown in FIG. 1, the annular combustor 18 includes a combustion annulus or chamber 36 generally defined by the inner, outer, and radially extending walls 22, 24 and 26, respectively. This combustion annulus or chamber 36 is disposed upstream of the outlet 20 of the annular combustor 18. Furthermore, an annulus 38 is disposed between the combustion annulus or chamber 36 and the turbine nozzle 16 in the region of the outlet 20 of the annular combustor 18, i.e., the outlet 20 leads to the nozzle 16 through the annulus 38.

Figure 3:
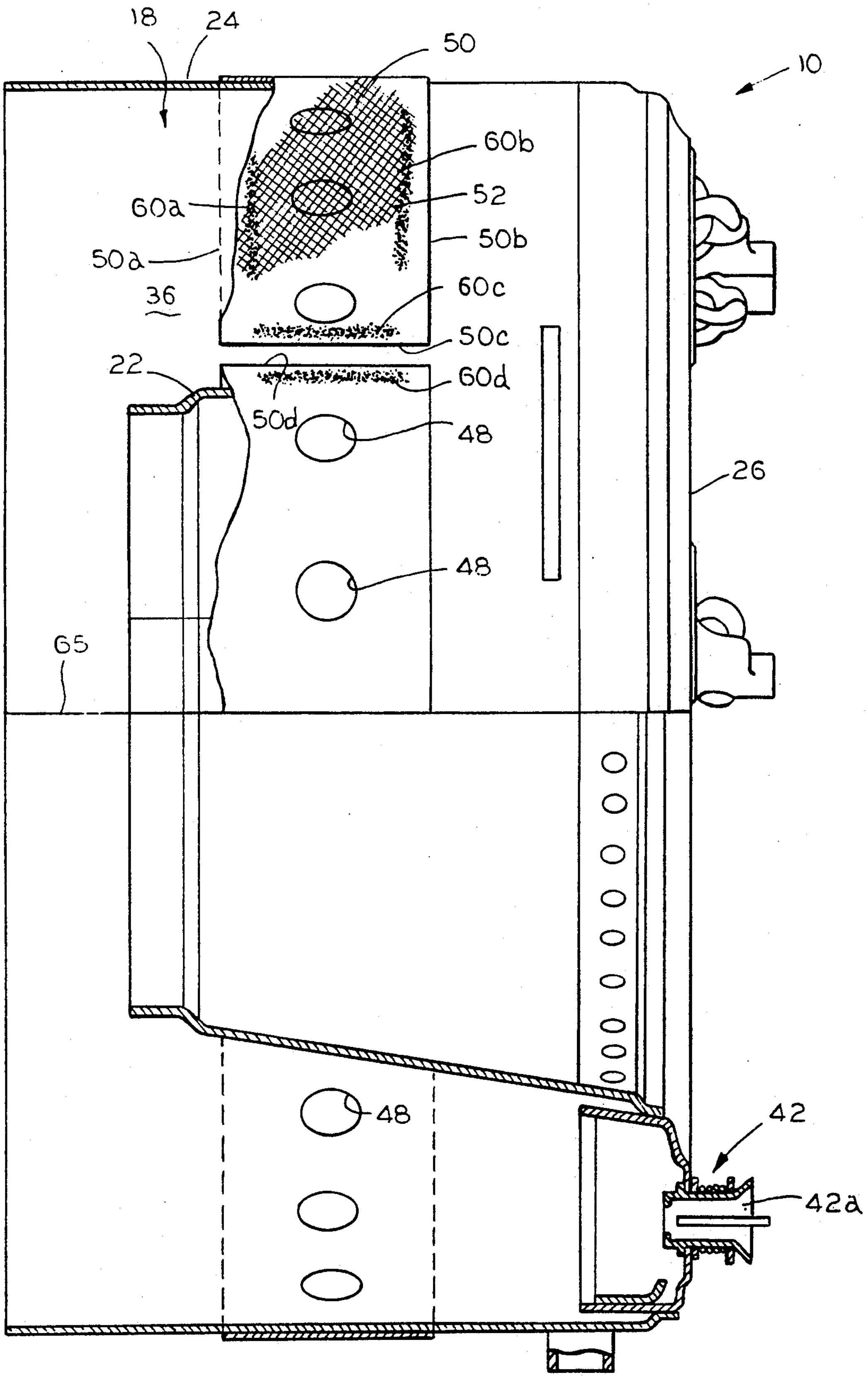
FIG. 3 is a somewhat schematic fragmentary side elevational view of a gas turbine engine constructed in accordance with the present invention.

As will be appreciated from FIGS. 1 and 3, the annular combustor 18 will preferably include a plurality of fuel injectors 42 which are conventional circumferentially spaced air blast fuel injectors. They may if desired be positioned in the outer wall 24 although in the illustrated embodiment they serve to spray a fuel/air mixture into the combustion annulus or chamber 36 in an axial direction from the radially extending wall 26 where it will be burned to produce the hot gases of combustion needed to drive the turbine blades 14. As will be described hereinafter, the hot gases of combustion are mixed with dilution air upstream of the outlet 20 prior to entry into the nozzle 16 in order to protect the nozzle blades 44 and the turbine blades 14.

For this purpose, the gas turbine engine 10 will preferably include a plurality of circumferentially spaced dilution air holes 48 in the outer wall 24 as illustrated in FIGS. 1 and 3. These dilution air holes 48 are provided at a point in the dilution air flow path 30 upstream of the fuel injectors 42. In this manner, they accommodate communication of the dilution air flow path 30 with the combustion annulus or chamber 36 to bleed air into the combustion annulus or chamber 36 for mixing with the hot gases of combustion.

In accordance with the invention, the gas turbine engine 10 also includes means associated with the dilution air holes 48 for preventing potentially obstructive matter from the combustion annulus 36 from passing through the dilution air holes 48. This suitably comprises a screen or wire mesh 50 which is strategically placed so as to be substantially contiguous with the outer wall 24 of the annular combustor 18 in a manner accommodating substantially unimpeded air flow through the dilution air flow path 30. As will be appreciated from FIGS. 1 and 3, the screen or wire mesh 50 is positioned to entirely cover the dilution air holes 48, and it is directly secured to an outer surface 24*a* of the outer wall 24 of the annular combustor 18 by brazing as at 52 and 54 (see FIGS. 1, *2c* and 3).

Referring to FIGS. *2a* through *2c*, a unique aspect of the present invention will be more fully understood and appreciated. FIG. *2a* illustrates that a screen or wire mesh such as 50 typically is known to require a selvage 56 in order to keep the screen or wire mesh such as 50 from unraveling. In order to avoid the expensive process of providing a selvage 56, and keeping with other combustor component constructions, the edges 50*a* and 50*b* of a screen or wire mesh such as 50 could be selvaged by utilizing sheet metal screen insulating strips 58 that are brazed to the outer surface 24*a* of the outer wall 24 as shown in FIG. *2b*. FIG. *2b* illustrates that the edges 50*a* and 50*b* of a screen or wire mesh such as 50 will then be brazed as at 60*a* and 60*b*, respectively. However, the strips 58 would shield and insulate the screen or wire mesh such as 50 as well as portions of the outer wall 24 from the cooling effects of air flowing through the dilution air flow path 30.

As will be appreciated, this will cause the screen or wire mesh such as 50 and portions of the outer wall 24 to be subjected to relatively hot and potentially damaging temperatures from the annular combustor 18. Thus, the present invention as illustrated in FIG. *2c* overcomes such problems by directly securing the screen or wire mesh 50 to the outer surface 24*a* of the outer wall 24. With this arrangement, the screen or wire mesh 50 is substantially entirely exposed to the dilution air flow path 30 and, thus, to the cooling air flowing through the dilution air flow path 30 from the compressed air inlet 34.

In addition, FIG. *2c* illustrates that the screen or wire mesh 50 is substantially contiguous with the outer wall 24 so as to accommodate substantially unimpeded air flow through the dilution air flow path 30. However, as will also be appreciated, the screen or wire mesh 50 is such that it is similar to placing trip strips on the convectively cooled outer wall 24 since a local turbulence will be created in the immediate vicinity of the screen or wire mesh 50 which will enhance local cooling. As a result, the screen or wire mesh 50 is secured in such a way as to solve the costly selvage problem while reducing local temperature to avoid rapid oxidation and/or thermal fatigue thereof.

Preferably, the screen or wire mesh 50 should be sized to catch potentially damaging carbon particles or lumps such as 62 (see FIG. 1). This is necessary so that a carbon particle or lump such as 62 cannot break away and become lodged as at 64 in the air passageway 42*a* of one of the fuel injectors 42. At the same time, the screen or wire mesh 50 should be sized so as not to significantly restrict the air flow therethrough.

In practice, the mesh size of the screen 50 is smaller than the size of the air passageways 42*a* of the fuel injectors 42, so as to allow fine particles and air to pass through unimpeded while preventing the passage of large carbon lumps.

As shown in FIG. 3, the dilution air holes 48 are disposed in circumferentially spaced relation in a common plane perpendicular to an axis 65 of the annular combustor 18. The single screen or wire mesh 50 is brazed to the outer surface 24*a* of the outer wall 24 both upstream and downstream of the dilution air holes 48. More specifically, the screen or wire mesh 50 is brazed as at 60*a* and 60*b* substantially entirely about the outer wall in planes parallel to the plane of the dilution air holes 48.

As will also be appreciated, the screen or wire mesh 50 is preferably a generally rectangular strip of material that has been wrapped around the outer wall 24. The rectangular strip is of a length slightly less than the circumference of the outer wall 24. Still referring to FIG. 3, it will be seen that both ends 50*c* and 50*d* are also brazed to the outer surface 24*a* of the outer wall 24 as at 60*c* and 60*d*, respectively.

As for the fuel injectors 42, they can take the form of any of a number of different types of air blast fuel injectors. Thus, the fuel injectors 42 may each include a fuel delivery tube 66 within an air blast tube 68 defining its air passageway 42*a*. As shown in FIG. 1, the air passageways 42*a* are each in communication with the dilution air flow path 30.

In practice, the carbon particles or lumps may provide problems especially when the gas turbine engine 10 is shut down at which time they may pass through one or more of the dilution air holes such as 48 into the dilution air flow path 30 at a point upstream of the fuel injectors 42. Then, upon restart of the gas turbine engine, the carbon particles or lumps can be carried forward by the incoming air in the dilution air flow path 30 to lodge in one of the air passageways 42*a* of the fuel injectors 42. Without the unique screen or wire mesh 50, the carbon particles or lumps could disrupt air flow through the air passageways 42*a* of some of the fuel injectors 42 causing poor fuel atomization with all of the consequent problems noted hereinabove.

Further, the gas turbine engine 10 is illustrated as including a bleed air delivery scroll 70 in communication with the dilution air flow path 30 through a plurality of bleed air holes 72. This arrangement is provided for delivering bleed air for one of several various purposes through a take-off pipe or tube 74. Without the unique features of the present invention, carbon particles or lumps may be drawn into the bleed air where it could damage components downstream of the take-off pipe or tube 74.

While in the foregoing there has been set forth a preferred embodiment of the invention, it will be understood that the details herein given are for purposes of illustration and the invention is only to be limited by the spirit and scope of appended claims.

We claim:

1. A gas turbine engine, comprising:

a rotor including turbine blades and a nozzle adjacent said turbine blades, said nozzle being adapted to direct hot gases of combustion to said turbine blades to cause rotation of said rotor;

an annular combustor about said rotor and having an outlet to said nozzle, said annular combustor having spaced inner and outer walls interconnected by a generally radially extending wall, said annular combustor also including a combustion annulus defined by said inner, outer and radially extending walls upstream of said outlet;

a housing substantially surrounding said annular combustor in spaced relation to said inner, outer, and radially extending walls thereof, said housing defining a dilution air flow path including a compressed air inlet in communication with a source of compressed air supplying dilution air at one end thereof, said dilution air flow path extending at least part way about said annular combustor;

at least one fuel injector having an air passageway positioned to inject air and fuel into said combustion annulus, said fuel injector extending through one of said walls of said combustor in fluid communication with said dilution air flow path;

at least one dilution air hole in said outer wall of said combustor at a point in said dilution flow air path upstream of said fuel injector, said dilution air hole accommodating communication of said dilution air flow path with said combustion annulus; and means associated with said dilution air hole for preventing potentially obstructive matter from said combustion annulus from passing through said dilution air hole into said dilution air flow path, said matter preventing means being in contact with said outer wall of said combustor about said dilution air hole in a manner accommodating substantially unimpeded air flow through said dilution air flow path.

2. The gas turbine engine of claim 1 wherein said matter preventing means includes a screen positioned to entirely cover said dilution air hole.

3. The gas turbine engine of claim 2 wherein said screen is directly secured to an outer surface of said outer wall of said combustor by brazing.

4. The gas turbine engine of claim 2 wherein said screen comprises a wire mesh substantially entirely exposed to said dilution air flow path.

5. A gas turbine engine, comprising:

a rotor including turbine blades and a nozzle adjacent said turbine blades, said nozzle being adapted to direct hot gases of combustion to said turbine blades to cause rotation of said rotor;

an annular combustor about said rotor and having an outlet to said nozzle, said annular combustor having spaced inner and outer walls interconnected by a generally radially extending wall, said annular combustor also including a combustion annulus defined by said inner, outer and radially extending walls upstream of said outlet;

a housing substantially surrounding said annular combustor in spaced relation to said inner, outer, and radially extending walls thereof, said housing defining a dilution air flow path including a compressed air inlet in communication with a source of compressed air supplying dilution air at one end thereof, said dilution air flow path extending at least part way about said annular combustor;

a plurality of fuel injectors each having an air passageway positioned to inject air and fuel into said combustion annulus, said fuel injectors each extending through one of said walls of said combustor in fluid communication with said dilution air flow path;

a plurality of dilution air holes in said outer wall of said combustor at a point in said dilution air flow path upstream of said fuel injectors, said dilution air holes being circumferentially spaced to accommodate communication of said dilution air flow path with said combustion annulus; and means associated with each of said dilution air holes for preventing potentially obstructive matter from said combustion annulus from passing through any of said dilution air holes into said dilution air flow path, said matter preventing means being in contact with said outer wall of said combustor substantially entirely about all of said dilution air holes in a manner accommodating substantially unimpeded air flow through said dilution air flow path, said matter preventing means thereby preventing matter potentially obstructive to said air passageways of said fuel injectors from passing into one or more of said air passageways of said fuel injectors.

6. The gas turbine engine of claim 5 wherein said matter preventing means includes a screen positioned to entirely cover said dilution air holes, said screen having a mesh size facilitating capture of said potentially obstructive matter while not appreciably inhibiting air flow

7. The gas turbine engine of claim 6 wherein said screen is directly secured to an outer surface of said outer wall of said combustor by brazing.

8. The gas turbine engine of claim 7 wherein said screen comprises a wire mesh substantially entirely exposed to said dilution air flow path.

9. The gas turbine engine of claim 5 wherein said preventing means includes a single screen positioned to cover all of said dilution air holes.

10. The gas turbine engine of claim 9 wherein said dilution air holes are disposed in a common plane perpendicular to an axis of said combustor.

11. The gas turbine engine of claim 10 wherein said screen is brazed to said outer wall upstream and downstream of said dilution air holes.

12. The gas turbine engine o f claim 11 wherein said screen is brazed to said outer wall substantially entirely about said outer wall.

13. A gas turbine engine, comprising:

a rotor including turbine blades and a nozzle adjacent said turbine blades, said nozzle being adapted to direct hot gases of combustion to said turbine blades to cause rotation of said rotor;

an annular combustor about said rotor and having an outlet to said nozzle, said annular combustor having spaced inner and outer walls interconnected by a generally radially extending wall, said annular combustor also including a combustion annulus defined by said inner, outer and radially extending walls upstream of said outlet;

a housing substantially surrounding said annular combustor in spaced relation to said inner, outer, and radially extending walls thereof, said housing defining a dilution air flow path including a compressed air inlet in communication with a source of compressed air supplying dilution air at one end thereof, said dilution air flow path extending at least part way about said annular combustor;

at least one fuel injector positioned to inject air and fuel into said combustion annulus, said fuel injector having an air passageway defined by a preselected size opening in fluid communication with said dilution air flow path, said fuel injector also including a fuel supply tube;

at least one dilution air hole in said outer wall of said combustor at a point in said dilution flow air path upstream of said fuel injector, said dilution air hole accommodating communication of said dilution air flow path with said combustion annulus; and a screen positioned to entirely cover said dilution air hole and directly secured to an outer surface of said outer wall of said combustor, said screen being disposed in a plane substantially parallel to and adjacent a plane in which said dilution air hole is disposed and having a mesh size selected relative to said preselected size opening in said air passageway of said fuel injector, said mesh size being selected to prevent clogging of said air passageway by particulate matter from said combustion annulus.

14. The gas turbine engine of claim 13 wherein said mesh size of said screen is smaller than the size of said preselected size opening defining said air passageway in said fuel injector 15. The gas turbine engine of claim 13 wherein said screen is secured by brazing in a manner whereby said screen is substantially entirely exposed to said dilution air flow path.

* * * * *